United States Patent
Hirooka et al.

[11] Patent Number: 6,035,941
[45] Date of Patent: Mar. 14, 2000

[54] TRACTOR WITH A FRONT LOADER

[75] Inventors: Masami Hirooka; Isao Kourogi, both of Sakai, Japan

[73] Assignee: Kubota Corporation, Osaka, Japan

[21] Appl. No.: 09/056,047

[22] Filed: Apr. 6, 1998

[30] Foreign Application Priority Data

Apr. 7, 1997 [JP] Japan .................................. 9-088222

[51] Int. Cl.⁷ .................................................. A01B 51/00
[52] U.S. Cl. ........................ 172/274; 172/275; 172/273; 414/686; 280/759
[58] Field of Search ..................................... 172/272, 273, 172/274, 275; 414/685, 686; 280/759; 180/291, 312

[56] References Cited

U.S. PATENT DOCUMENTS

| | | | |
|---|---|---|---|
| 3,492,019 | 1/1970 | Folkerts | 280/150 |
| 3,730,545 | 5/1973 | Allori | 280/150 E |
| 4,033,469 | 7/1977 | Frank | 172/272 X |
| 4,065,009 | 12/1977 | Old | 172/274 X |
| 4,094,534 | 6/1978 | Welke et al. | 280/760 |
| 4,232,883 | 11/1980 | Bourgeous et al. | 280/759 |
| 4,537,423 | 8/1985 | Nau et al. | 280/759 |
| 4,554,978 | 11/1985 | Schneider | 172/247 |
| 4,793,764 | 12/1988 | Hamm | 172/274 X |
| 4,919,212 | 4/1990 | McClure | 172/274 |
| 5,536,134 | 7/1996 | Hirooka | 414/686 |
| 5,540,289 | 7/1996 | Hirooka et al. | 172/274 |

Primary Examiner—Victor Batson
Attorney, Agent, or Firm—Webb Ziesenheim Logsdon Orkin & Hanson, P.C.

[57] ABSTRACT

A tractor for use with a front loader connected thereto has a pair of mast mounts for detachably attaching right and left masts of the front loader, a pair of braces for coupling the mast mounts to the tractor, and a weight mount for carrying a plurality of weights. The braces have distal ends thereof connected to the weight mount. A spacing L1 between the distal ends of the braces is smaller than a spacing L2 between proximal ends thereof. Consequently, the braces are arranged to avoid their interference with front wheel steering. With the weight mount acting also as a brace support, the weight mount has an increased supporting strength.

9 Claims, 6 Drawing Sheets

TRACTOR WITH A FRONT LOADER

BACKGROUND OF THE INVENTION

1. Field of the Invention

This invention relates to a tractor having a tractor body for connecting a front loader thereto. A tractor for use with a front loader or as a tractor-loader-backhoe (TLB) may be in a state having the front loader connected thereto, and in a state having the front loader disconnected and a rear working implement such as a backhoe connected. This invention relates to the former state in particular.

2. Description of the Related Art

The tractor body includes a front axle frame extending forward from an engine, a pair of right and left mast mounts and a pair of right and left braces. A weight mount is attached to the front of the front axle frame. The front loader has masts detachably attached to the mast mounts. Rear ends of the braces also are coupled to the mast mounts.

When the front loader is disconnected from the tractor, weights are attached to the front of the tractor through a loader coupling device remaining on the tractor. The weight mount is used exclusively for attaching the weights.

In the conventional construction noted above, forward portions of the braces are coupled to brackets projecting from the front axle frame, and are disposed inwardly of front wheels. This arrangement imposes a limitation to steering of the front wheels. It is also difficult to increase the supporting strength of the weight mount.

In order to avoid the limitation to front wheel steering, it is conceivable to extend distal ends of the right and left braces forwardly of the front axle frame, and support the distal ends with brace supports projecting from the front axle frame. However, such a construction would not allow the weight mount to be attached to the tractor.

SUMMARY OF THE INVENTION

An object of this invention is to provide an improved tractor which imposes no limitation to front wheel steering and which realizes an increased supporting strength of the weight mount.

Another object of this invention is to provide a tractor in which distal ends of braces are attached simply and reliably.

A further object of this invention is to provide a tractor for allowing weights to be mounted reliably.

The above objects are fulfilled, according to one aspect of this invention, by a tractor for use with a front loader connected thereto, comprising a front axle frame extending forward; a pair of mast mounts for detachably attaching right and left masts of the front loader; a pair of braces for coupling the mast mounts to the tractor, wherein the braces are spaced apart by a smaller distance at distal ends than at proximal ends thereof; and a weight mount for carrying a plurality of weights, the weight mount being attached to a forward position of the front axle frame, the distal ends of the braces being connected to the weight mount.

According to this construction, the right and left braces have a spacing L1 between the distal ends thereof which is smaller than a spacing L2 between the proximal ends, thereby eliminating the above-mentioned limitation to front wheel steering. Further, with the distal ends of the braces connected to the weight mount, the weight mount is used also as a brace support. Consequently, the weight mount has an increased supporting strength, and the number of components is reduced to achieve a cost reduction.

In another aspect of this invention, the weight mount includes a pair of side walls for attaching the braces, the side walls having a spacing therebetween gradually reducing downward.

Where the tractor is constructed in this way, each side wall extends substantially along the distal end of the corresponding brace to act as a guide when attaching the brace. Moreover, the braces have little possibility of falling off since the side walls of the weight mount are inclined instead of being vertical. Thus, the distal ends of the braces are attachable to the weight mount simply and reliably.

In a further aspect of this invention, the weight mount includes a front member for attaching the weights, the front member having a first engaging portion for engaging a hooked portion of each of the weights, a second engaging portion for engaging a projection formed in an intermediate position of each of the weights, and a third engaging portion for connecting a fastening element extending through the weights. With this construction, the weights may be attached to the weight mount reliably.

Other features and advantages of this invention will be apparent from the following description of the embodiment to be taken with reference to the drawing.

DESCRIPTION OF THE PREFERRED EMBODIMENT

Figure 1:
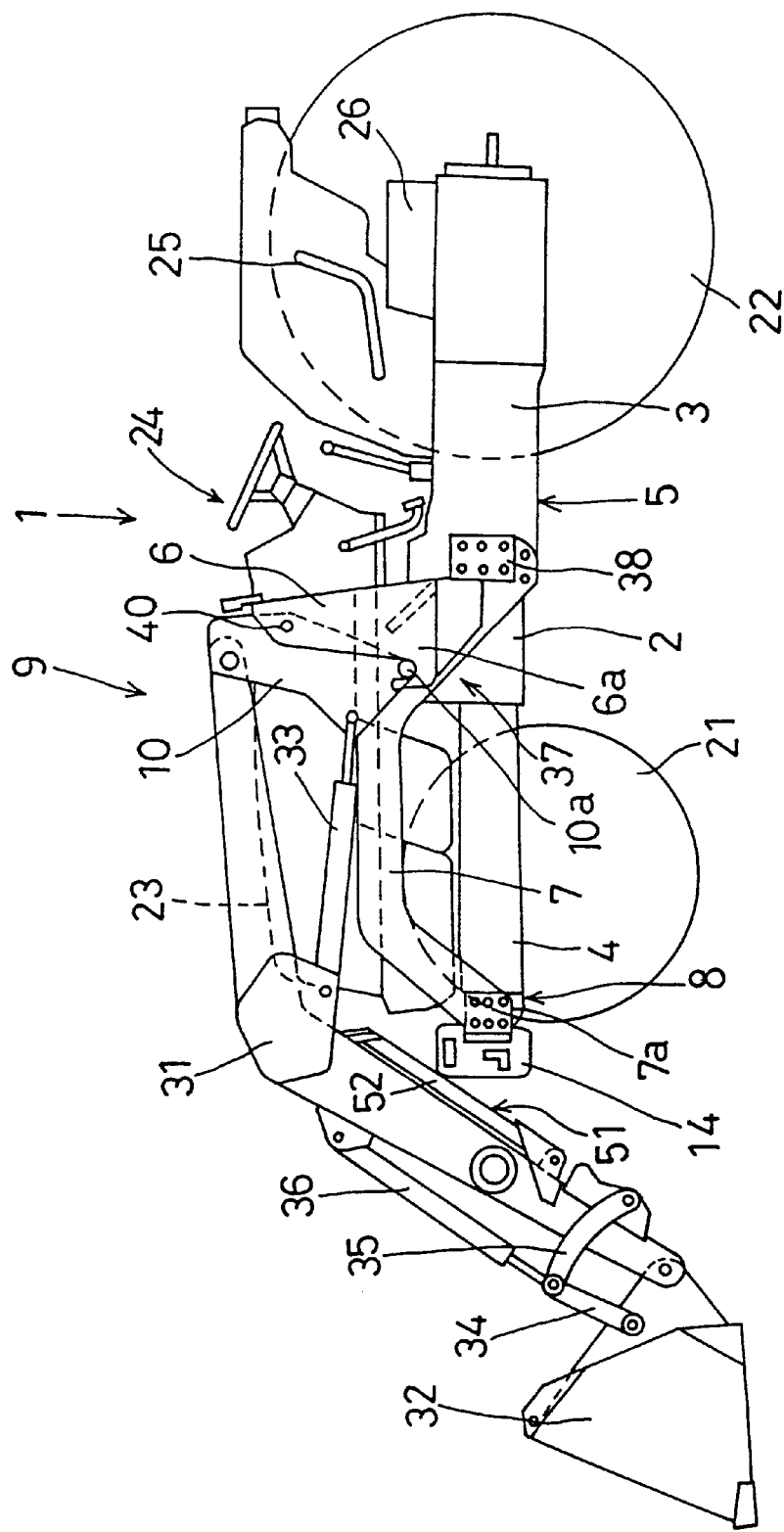
FIG. 1 is a side elevation of a tractor embodying this invention, with a front loader connected to the tractor.

A preferred embodiment of this invention will be described hereinafter with reference to the drawings.

In FIGS. 1 through 6, numeral 1 denotes a tractor. The tractor 1 includes an engine 2, a transmission case 3 connected directly to the rear of engine 2, a front axle frame 4 extending forwardly from the engine 2. These components constitute a tractor body 5.

Numeral 21 denotes dirigible front wheels. Numeral 22 denotes rear wheels. Numeral 23 denotes a hood. Numeral 24 denotes a control section. Numeral 25 denotes a driver's seat. Numeral 26 denotes a hydraulic device for raising and lowering a working implement (not shown) connected to the rear of tractor body 5.

Numeral 9 denotes a front loader detachably attached to the front of tractor 1. The front loader 9 includes a pair of right and left masts 10, a pair of right and left booms 31 having rear ends thereof pivotally coupled to the masts 10, a working tool or bucket 32 pivotally coupled to forward ends of the booms 31, a boom cylinder 33 extending between intermediate positions of booms 31 and lower positions of masts 10, links 34 and 35 extending between forward ends of booms 31 and the bucket 32, and a bucket cylinder 36 for swinging the bucket 32 through these links 34 and 35.

Numeral 37 denotes a coupling device for coupling the front loader 9. The coupling device 37 includes a pair of right and left mast mounts 6 for detachably attaching the masts 10 to the tractor body 5 through a pair of right and left fixed frames 38, a pair of right and left braces 7 for coupling the mast mounts 6 to the front of tractor body 5, and a weight mount 8 attached to the front of front axle frame 4.

The right and left fixed frames 38 are secured to right and left side surfaces of the transmission case 3 to extend forwardly and laterally outwardly therefrom. The braces 7 are fixed at rear ends thereof to outer ends of the fixed frames 38, and the mast mounts 6 are fixed to rear, outer surfaces of the braces 7. The rear ends of braces 7 may be bolted to the mast mounts 6 which in turn may be bolted to the fixed frames 38.

The mast mount's 6 have lower receiving portions 6a, and upper pinholes. The masts 10 are detachably attached to the mast mounts 6, with lower coupling portions 10a of the masts 10 received by the receiving portions 6a, and pins 40 passed through upper portions of the mast mounts 6 and masts 10.

Figure 5:
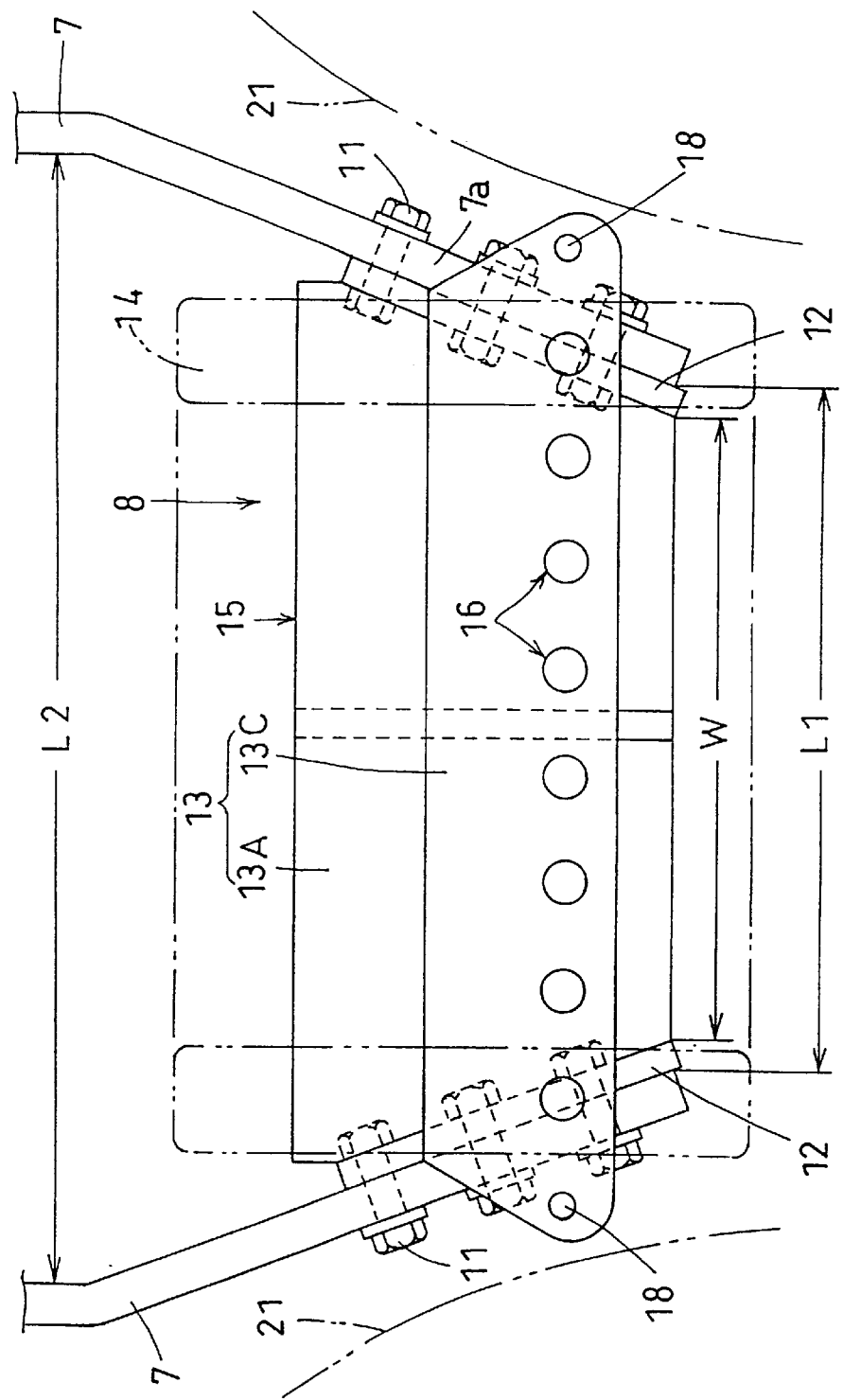
FIG. 5 is a front view of a weight mount.
Figure 6:
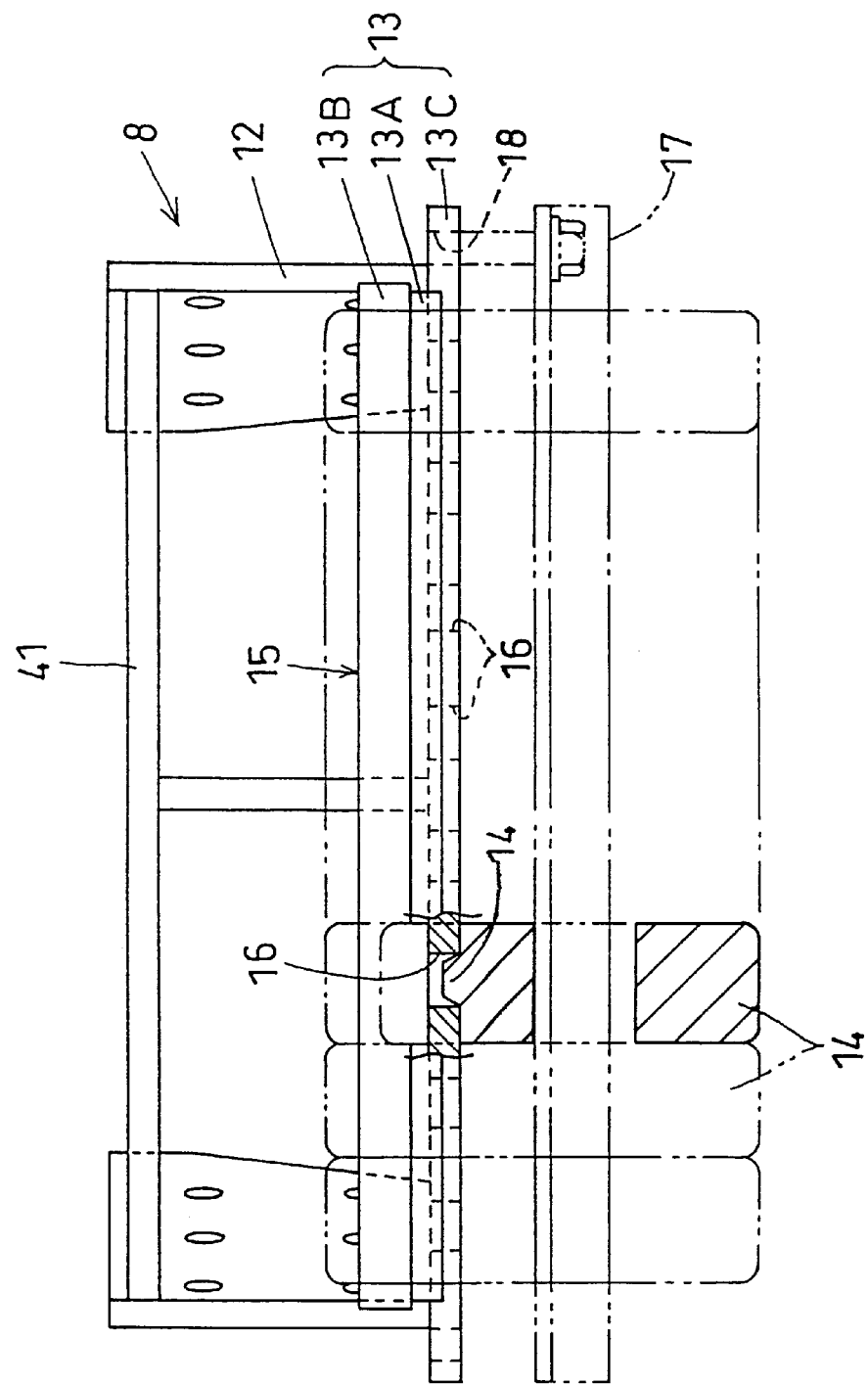
FIG. 6 is a plan view, partly in section, of the weight mount.

The braces 7 are approximately arch-shaped in side view, and have portions thereof from rear ends to intermediate positions extending parallel to or progressively closer to lateral surfaces of the hood 23. At least portions of the braces 7 from the intermediate positions to the distal ends extend progressively closer to the front axle frame 4. The right and left braces 7 are spaced apart by a distance L1 at the distal ends 7a which is smaller than a distance L2 at the proximal ends (FIG. 5). The distal ends 7a of braces 7 are connected to the weight mount 8 by a plurality of bolts 11. Thus, the weight mount 8 is used also as a brace support for supporting the distal ends 7a of braces 7 in the transverse direction.

The weight mount 8 has right and left side walls 12, a front member 13 interconnecting front portions of the side walls 12, and a rear wall 41 interconnecting rear portions of the side walls 12. The rear wall 41 is connected to the front surface of the front axle frame 4 by a plurality of bolts 39. The right and left side walls 12 have a spacing W therebetween which gradually reduces downward, so that the side walls 12 may follow the distal ends 7a of the braces 7 to be connected thereto. That is, the distal ends 7a of the braces 7 as well as the right and left side walls 12 of the weight mount 8 have lower portions inclined somewhat inwardly of the tractor body 5 instead of extending vertically (see FIG. 5). The distal ends 7a of the braces 7 and the right and left side walls 12 of the weight mount 8 are connected together by the bolts 11.

The front member 13 includes an upper front plate 13A, an upper plate 13B and a lower front plate 13C. The upper plate 13B is fixed to a rear surface of the upper front plate 13A to define a hook receiver 15 for engaging upper hooked portions 14a of a plurality of weights 14.

The lower front plate 13C has a plurality of bores extending in the fore and aft direction therethrough. These bores define projection receiving portions 16 for engaging projections 14b formed in intermediate positions of the respective weights 14. The lower front plate 13C further includes threaded bores arranged at right and left sides of the projection receiving portions 16. These threaded bores act as fastening portions 18 for connecting a metal piece 17 extending through the weights 14, to the weight mount 8 by means of bolts 19. In the illustrated embodiment, the weight mount 8 can receive a maximum of eight weights 14.

Numeral 51 denotes a stand for supporting the booms 31, with the bucket 32 resting on the ground, when the front loader 9 is detached from the tractor 1. The stand 51 includes a tubular leg 52 having a rectangular section, a boom contact 53 fixed to a side surface at one end of the leg 52 for contacting lower positions of the booms 31, and a ground-engaging element 54 fixed to the other end of the leg 52 for contacting the ground.

The boom contact 53 is in the form of an approximately triangular plate. The boom contact 53 is attached to the lower positions of the booms 31 to be pivotable about a support axis 55 extending through right and left brackets (not shown).

Figure 2:
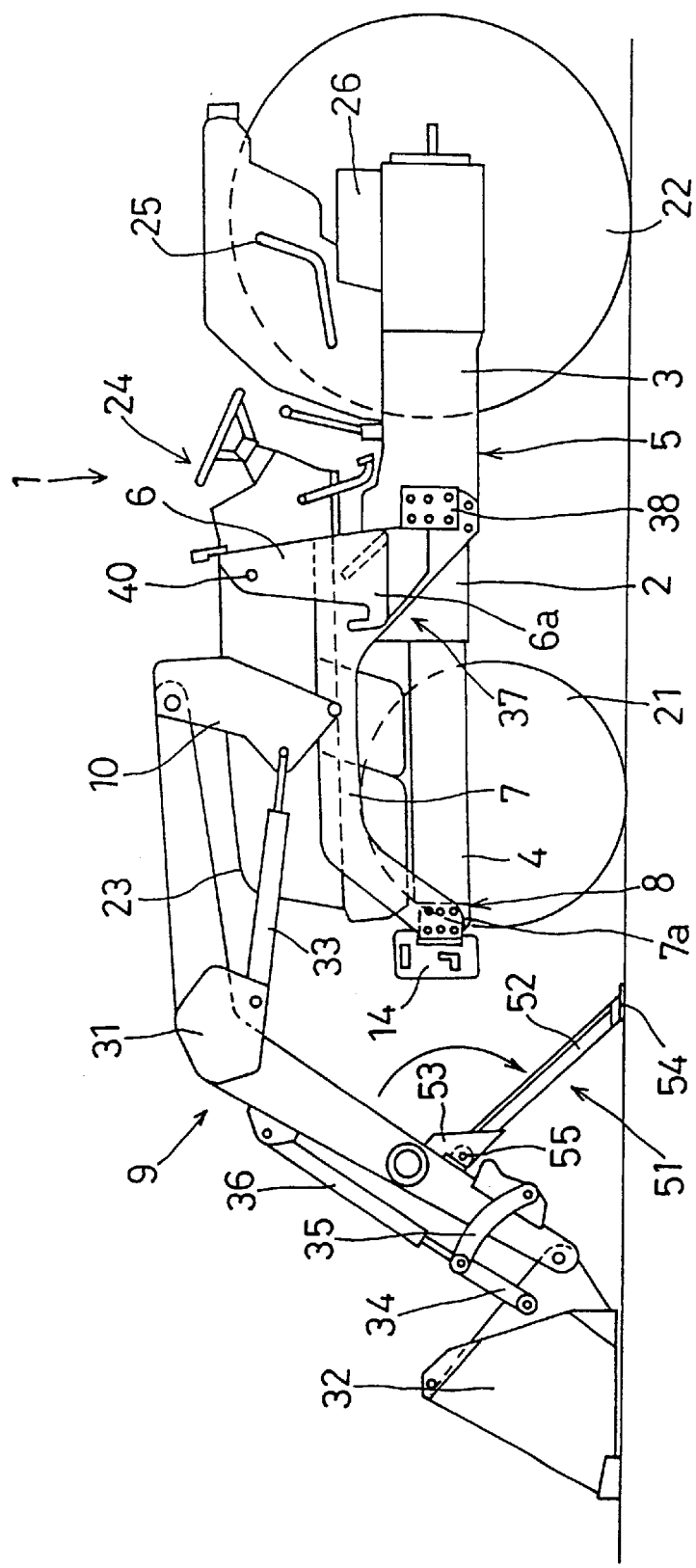
FIG. 2 is a side view of the front loader disconnected from the tractor.
Figure 3:
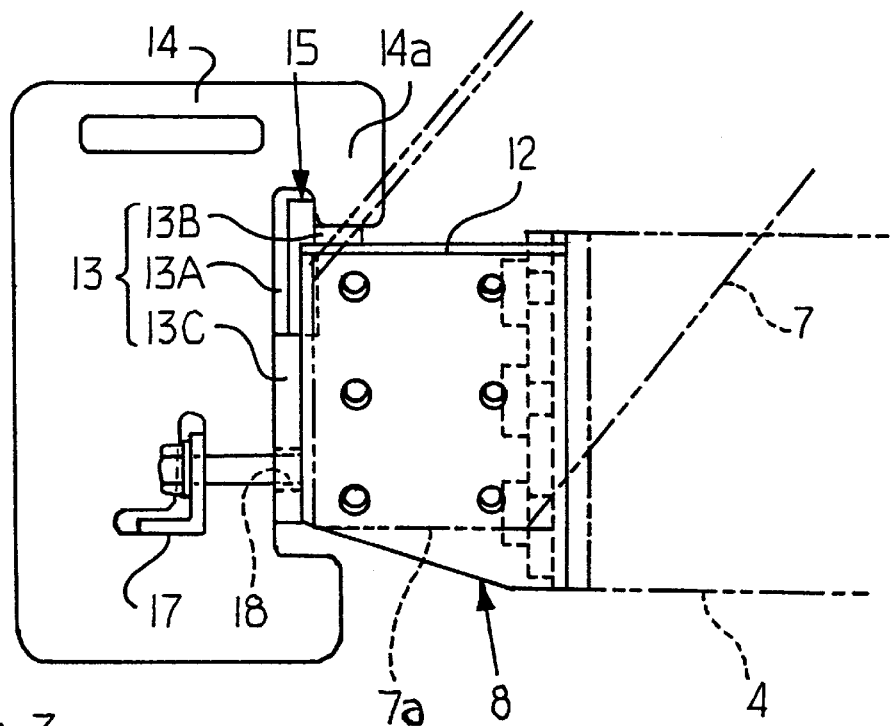
FIG. 3 is a side view showing a principal portion of FIG. 1.
Figure 4:
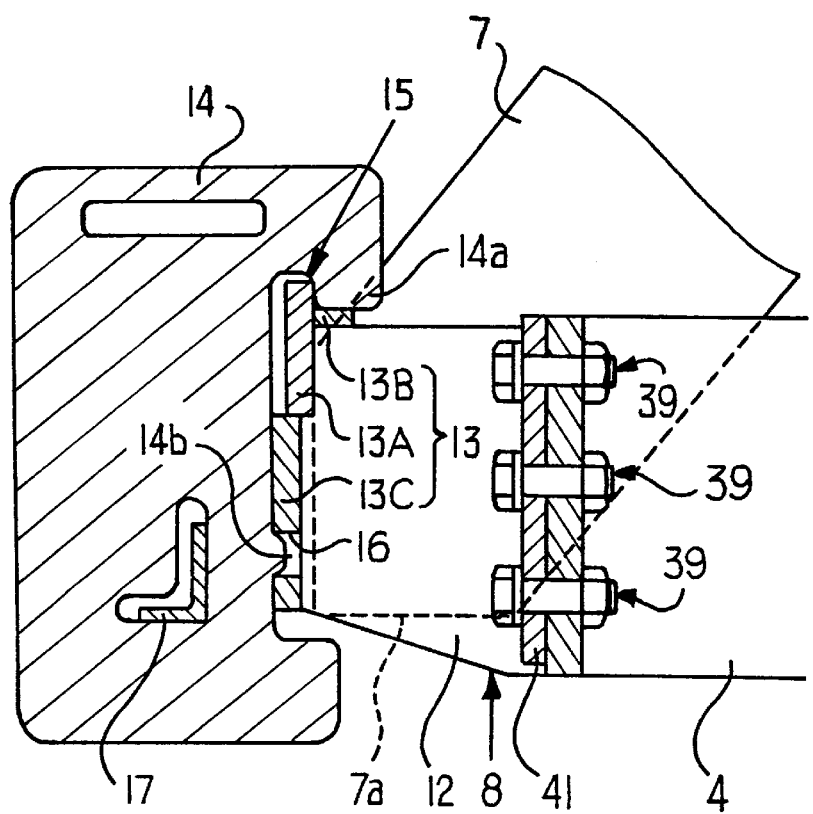
FIG. 4 is a sectional side view showing the principal portion of FIG. 1.

The stand 51 is movable between a non-use position shown in solid lines in FIG. 1 and a use position shown in solid lines in FIG. 2. The boom contact 53 is disengaged from the booms 31 by displacing the booms 31 and support axis 55 sideways from the position in which the stand 51 is in use. As a result of this disengagement, the stand 51 becomes pivotable upward about the support axis 55 to the non-use position extending substantially parallel to the booms 31. The ground-engaging element 54 of the stand 51 in the non-use position is fixed to the booms 31 by an appropriate fixing device. For this purpose, the booms 31 may have a pin (not shown) projecting therefrom to be fitted in a bore (not shown) formed in the ground-engaging element 54, and the pin may be retained in place by a beta pin (not shown).

By constructing the stand 51 as described above, the boom contact 53 can reliably bear the load of the booms 31. Moreover, as shown in FIG. 1, the support axis 55 of the stand 51 is located in a relatively lower position of the booms 31, which allows the stand 51 to move between the use position and non-use position easily without interfering with the front wheels 4.

Figure 7:
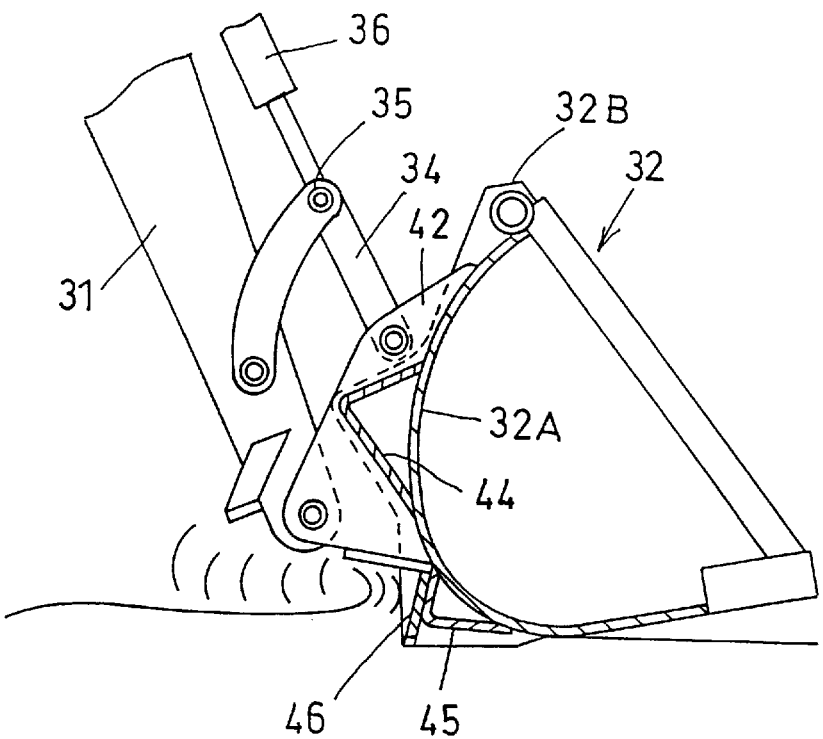
FIG. 7 is a side view of a bucket of the front loader.
Figure 8:
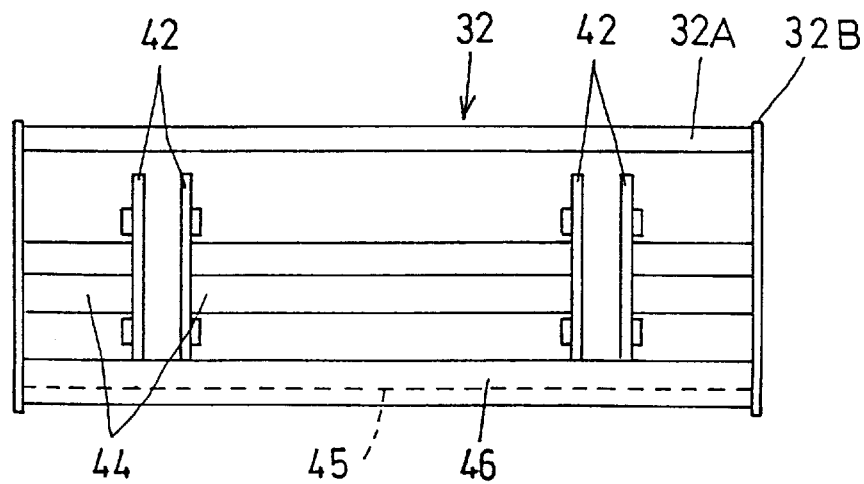
FIG. 8 is a rear view of the bucket shown in FIG. 7.

FIGS. 7 and 8 show one example of bucket 32. The bucket 32 includes a bracket 42 projecting from a rear wall 32A thereof for coupling to the right and left booms 31. The bucket 32 further includes reinforcements 44 and 45 formed of bent plates and extending between right and left side walls 32B of the bucket 32.

A blade 46 is fixed to the back of the lower reinforcement 45. The blade 46 is slightly inclined forward, and projects downward from the reinforcement 45. With this construction, when the tractor 1 is driven backward with the bucket 32 contacting the ground, the blade 46 scrapes the ground to prevent lifting of the bucket 32 off the ground.

What is claimed is:

1. A tractor adapted to mount a front loader, comprising:
   a tractor body having a pair of front axle frames extending forward;
   a pair of mast mounts detachably attaching right and left masts of said front loader;
   a pair of fixed frames extending laterally from said tractor body to connect said pair of mast mounts to said tractor body;
   a pair of braces, a proximal end of each brace is connected to at least one of said mast mounts and one of said fixed frames, said braces being spaced apart by a smaller distance at distal ends thereof than at proximal ends thereof; and
   a weight mount for carrying a plurality of weights, said weight mount being attached to a forward position of said front axle frame, said distal ends of said braces being connected to said weight mount.

2. A tractor as defined in claim 1, wherein said weights are disposed forwardly of front wheels of said tractor.

3. A tractor as defined in claim 1, wherein, with said distal ends of said braces are connected to said weight mount, said weight mount supports said braces in a transverse direction of said tractor.

4. A tractor as defined in claim 1, wherein said weight mount includes a pair of side walls for attaching said braces, said side walls having a spacing therebetween gradually reducing downward.

5. A tractor as defined in claim 1, wherein said weight mount includes a front member for attaching said weights, said front member having a first engaging portion for engaging a hooked portion of each of said weights, a second engaging portion for engaging a projection formed in an intermediate position of each of said weights, and a third engaging portion for connecting a fastening element extending through said weights.

6. A tractor as defined in claim 1, wherein said proximal ends of said braces are connected to lateral ends of said fixed frames.

7. A tractor as defined in claim 1, wherein said proximal ends of said braces are connected to said mast mounts by means of bolts.

8. A tractor as defined in claim 1, wherein a lower edge of each of said braces has a generally arch-like configuration with a middle portion of said edge being offset above said distal and proximal ends of said braces.

9. A tractor as defined in claim 1, wherein a lower edge of each of said braces has a generally arch-like configuration with a middle portion of said edge being offset above said front axle frame with said proximal and distal ends of said braces positioned below a top edge of said front axle frame.

* * * * *